United States Patent [19]

Hamada et al.

[11] Patent Number: 5,066,721
[45] Date of Patent: Nov. 19, 1991

[54] TIRES MADE OF SILICA FILLED, SILANE MODIFIED RUBBER

[75] Inventors: Tatsuro Hamada, Higashi-murayama; Hiromi Fukuoka; Hideki Komatsu, both of Kodaira; Tatsuo Fujimaki, Higashi-murayama, all of Japan

[73] Assignee: Bridgestone Corporation, Tokyo, Japan

[21] Appl. No.: 202,658

[22] PCT Filed: Oct. 3, 1987

[86] PCT No.: PCT/JP87/00738
§ 371 Date: May 31, 1988
§ 102(e) Date: May 31, 1988

[87] PCT Pub. No.: WO88/05448
PCT Pub. Date: Jul. 28, 1980

[30] Foreign Application Priority Data

Jan. 14, 1987 [JP] Japan .................................. 62-6568

[51] Int. Cl.$^5$ .................. C08L 83/08; C08L 47/00
[52] U.S. Cl. ................................ 525/102; 525/105
[58] Field of Search ........................... 525/102, 105

[56] References Cited

U.S. PATENT DOCUMENTS

| | | | |
|---|---|---|---|
| 3,281,383 | 10/1966 | Zelinski | 525/101 |
| 3,483,270 | 12/1969 | Bostick | 525/105 |
| 3,692,874 | 9/1972 | Farrar | 525/105 |
| 4,145,498 | 3/1979 | Farrar | 526/180 |
| 4,185,042 | 1/1980 | Verkouw | 525/385 |

FOREIGN PATENT DOCUMENTS

| | | | |
|---|---|---|---|
| 1196927 | 11/1985 | Canada | 525/105 |
| 49-36957 | 10/1974 | Japan . | |
| 52-5071 | 2/1977 | Japan . | |
| 54-94597 | 7/1979 | Japan . | |
| 56-104906 | 8/1981 | Japan . | |
| 62-50346 | 3/1987 | Japan . | |

Primary Examiner—Paul R. Michl
Assistant Examiner—Peter Szekely
Attorney, Agent, or Firm—Sughrue, Mion, Zinn Macpeak & Seas

[57] ABSTRACT

There is a tire having tire performances such as wear resistance, cut resistance, heat build-up and the like and a processability simultaneously and economically improved by the application of a rubber composition containing a rubbery polymer modified with a silane compound and silica. The rubbery polymer modified with the silane compound is obtained by reacting an active terminal of a living polymer, which is obtained by polymerizing a monomer in the presence of an organic alkali metal catalyst, with a silane compound represented by the following general formula:

$$X_n Si(OR)_m R'_{4-m-n}$$

(where X is a halogen atom selected from a chlorine atom, a bromine atom and an iodine atom, OR is a non-hydrolyzable alkoxy group having a carbon number of 4~20, an aryloxy group or a cycloalkoxy group, R' is an alkyl group having a carbon number of 1~20, an aryl group, a vinyl group or a halogenated alkyl group, m is an integer of 1~4, n is an integer of 0~2, and a sum of n and m is 2~4), which is contained in an amount of not less than 10% by weight as a rubber ingredient, and silica is contained in an amount of 5~200 parts by weight based on 100 parts by weight of the rubber ingredient.

9 Claims, No Drawings

TIRES MADE OF SILICA FILLED, SILANE MODIFIED RUBBER

TECHNICAL FIELD

This invention relates to rubber tires such as pneumatic tires, solid tires and the like, and more particularly to a tire having economically improved performances by applying a rubber composition containing a rubbery polymer modified with a silane compound and silica to the rubber tire.

BACKGROUND ART

Heretofore, white fillers such as silica, magnesium carbonate and the like were exceptional to be compounded with a rubber composition for tires because they have problems in the tensile strength, modulus of elasticity and rebound resilience of the vulcanizate as compared with carbon black for the rubber reinforcement.

On the contrary, Japanese Patent Application Publication No. 40-20,262 discloses that the slipping resistance is improved in a tire comprising a tread made by compounding silica with a rubber composition containing butadiene rubber, oil and carbon. However, it will be expected that the wear resistance is poor because the modulus of elasticity is low.

Furthermore, Japanese Patent Application Publication No. 38-26,765 proposes a method wherein rubber having a higher modulus of elasticity is obtained by mixing silica sol with a rubber latex and spray-drying them as compared with a case of the usual kneading method.

Even in this method, however, it is at the present condition that the effect is not equal to the reinforcing effect of the carbon black.

And also, a tire tread for winter season tire having an improved slipping resistance by using a silane compound containing silica and sulfur atom is proposed in Japanese Patent laid open No. 50-88,150. However, it is required to use a large amount of the silane compound for obtaining preferable tread properties.

Moreover, Japanese Patent Application Publication No. 49-36,957 proposes a method wherein a lithium-terminated polymer obtained by using an organic lithium compound as a catalyst for the purpose of improving the processability is reacted with silicon tetrahalide, trichloromethyl silane or the like to produce a branched polymer centering the silane compound. However, the resulting polymer remains no functional group having a reactivity with silica, so that the tensile strength of a vulcanizate using silica as a filler is insufficient. Furthermore, the rubber obtained by compounding silica with this polymer enhances the viscosity and green strength at an unvulcanized state and the rolling and extruding properties can be improved, but has a drawback that the permanent elongation and dynamic heat build-up are large.

In addition, Japanese Patent laid open No. 56-104,906 discloses the addition of a silane compound having at least two hydrolyzable functional groups in its molecule and represented by the following general formula:

(wherein X is a halogen atom, Y is a hydrolyzable organic group other than halogen, R is an alkyl group, an aryl group, a vinyl group or a halogenated alkyl group, n is 0 or 1 and m is an integer of 1 to 4, provided that a sum of n and m is at least 2). In this case, an alkoxy group is preferred as the hydrolyzable organic group Y other than halogen. As a most preferable silane compound, there are mentioned tetraethoxysilane, triethoxymonochlorosilane, diethoxymonochloromonomethylsilane, triethoxymonomethylsilane, trimethoxymonomethylsilane, diethoxydimethylsilane, dimethoxydimethylsilane, dimethyldiacetoxysilane, methyltriacetoxysilane, chloromethyltriethoxysilane and 3-chloropropyltriethoxysilane.

However, the hydrolyzable alkoxy group is hydrolyzed after the completion of polymerization reaction and in the steam solidification, so that it is impossible to improve the tire performances by using the resulting rubbery polymer modified with silane compound in a rubber composition containing silica as a reinforcing agent.

The invention is to solve the aforementioned conventional technical problems and to simultaneously improve the tire performances such as wear resistance, cut resistance, heat built-up and the like and economically achieve the improvement of processability, which are difficult in the conventional technique, by using a rubber composition having sufficiently high tensile strength and wear resistance even at a vulcanized state containing a white filler such as silica or the like in a tire without using a large amount of the conventional reinforcing assistant such as silane coupling agent or the like.

DISCLOSURE OF INVENTION

That is, the invention provides a tire, characterized in that a rubber composition comprising not less than 10% by weight of a rubbery polymer modified with a silane compound obtained by reacting an active terminal of a living polymer, which is obtained by polymerizing a monomer in the presence of an organic alkali metal catalyst, with a silane compound represented by the following general formula (I):

wherein X is a halogen atom selected from a chlorine atom, a bromine atom and an iodine atom, OR is a non-hydrolyzable alkoxy group having a carbon number of 4~20, an aryloxy group or a cycloalkoxy group, R' is an alkyl group having a carbon number of 1~20, an aryl group, a vinyl group or a halogenated alkyl group, m is an integer of 1~4, n is an integer of 0~2, and a sum of n and m is 2~4) (hereinafter referred to as silane compound-modified rubbery polymer simply) as a rubber ingredient and containing 5~200 parts by weight of silica based on 100 parts by weight of the rubber ingredient is applied to at least one portion among rubber portions of the tire.

As an inert organic solvent used in the production of the silane compound-modified rubbery polymer according to the invention, for example, pentane, hexane, cyclohexane, heptane, benzene, xylene, toluene, tetrahydrofuran, diethylether and the like are used.

Furthermore, a Lewis base may be used as a randomizing agent in case of copolymerization or as an agent for adjusting a microstructure of a conjugated diene when using the conjugated diene as a comonomer, if necessary. As such a base, mention may be made of ethers and tertiary amines such as dimethoxybenzene, tetrahydrofuran, dimethoxyethane, diethyleneglycol dibutylether, diethyleneglycol dimethylether, triethylamine, pyridine, N-methylmorpholine, N,N,N',N'-tetramethyl ethylenediamine, 1,2-dipiperidinoethane and the like.

Moreover, as the organic alkali metal catalyst used in the production of the silane compound-modified rubbery polymer according to the invention, mention may be made of alkyllithiums such as n butyllithium, sec-butyllithium, t-butyllithium, 1,4-dilithium butane, a reaction product of butyllithium and divinylbenzene and so on, alkylenedilithiums, phenyllithium, stilbenedilithium, diisopropenylbenzenedilithium, sodium naphthalene, lithium naphthalene and the like.

As the monomer used in the silane compound-modified rubbery polymer according to the invention, all monomers capable of conducting the living polymerization in the presence of the organic alkali metal catalyst are included, an example of which may include a conjugated diene, vinyl aromatic compound, vinylpyridine, acrylonitrile, methacrylonitrile, methylmethacrylate, acrylic ester and the like.

Among them, the conjugated diene and/or vinyl aromatic compound are preferable.

As the conjugated diene, mention may be made of 1,3-butadiene, 2,3-dimethylbutadiene, isoprene, chloroprene, 1,3-pentadiene, hexadiene and the like. Among them, 1,3-butadiene or isoprene is preferable from a viewpoint of copolymerization easiness with other monomer. These conjugated dienes may be used alone or in admixture of two or more dienes. The repeated unit of the conjugated diene is mainly as follows:

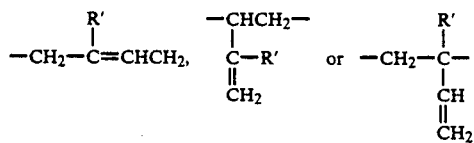

(wherein R' is a hydrogen atom, a methyl group or a chlorine atom).

As the aromatic vinyl compound, styrene, α-methylstyrene, p-methylstyrene, o-methylstyrene, p-butylstyrene, vinylnaphthalene and the like are mentioned, among which styrene is preferable. Such aromatic vinyl compounds may be used alone or in admixture thereof.

The repeated unit of the aromatic vinyl compound is mainly as follows:

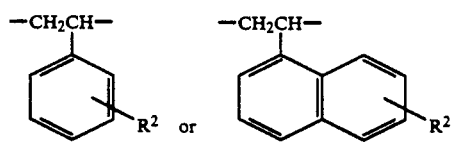

(wherein $R^2$ is a hydrogen atom, an alkyl group having a carbon number of 1~10 or a halogen atom).

Moreover, when the conjugated diene is used together with the aromatic vinyl compound, the ratio of conjugated diene/aromatic vinyl compound (mol ratio) is 100/0~40/60, preferably 95/5~55/45.

The polymerization of the living polymer used in the invention is carried out by charging the polymerization system together with the inert organic solvent, monomer and organic alkali metal catalyst used in the invention and, if necessary, Lewis base into a reaction vessel purged with nitrogen at once, or intermittently or continuously adding them to thereby conduct the polymerization.

The polymerization temperature is usually −120°~+150° C., preferably −80°~+120° C., and the polymerization time is usually 5 minutes~24 hours, preferably 10 minutes~10 hours.

The polymerization may be performed while maintaining the polymerization temperature at a certain value within the above temperature range or gradually raising it, or under adiabatic condition. Furthermore, the polymerization reaction may be batch type or continuous type.

Moreover, the concentration of the monomer in the solvent is usually 5~50% by weight, preferably 10~35% by weight.

In order to prevent the deactivation of the organic alkali metal catalyst and the living polymer in the production of the living polymer, it is necessary to take a care of removing the incorporation of a deactivating compound such as a halogen compound, oxygen, water, carbon dioxide gas or the like into the polymerization system as far as possible.

The silane compound-modified rubbery polymer is a modification rubbery polymer having Si—O—R bond (R is the same as mentioned above) and substantially causing no hydrolysis, which is obtained by reacting a particular silane compound to an active terminal of the living polymer obtained in the above polymerization system.

The term "substantially no hydrolysis" used herein means a case that when 60 g of a rubber sheet shaped between hot rolls of 120° C. at a space of 0.5 mm is left to stand in a stainless vessel of 10 l capacity containing 3 l of warm water for 30 minutes while blowing a steam into warm water to boil the warm water - and then dried, the rise of Mooney viscosity ($ML_{1+4}$, 100° C.) of the thus treated polymer is not more than 10 point, preferably not more than 5 point as compared with that of non-treated polymer.

The silane compound to be reacted with the living polymer according to the invention is a silane compound having a non-hydrolyzable alkoxy group in its molecule and is represented by the following general formula (I):

$$X_n Si(OR)_m R'_{4-n-m} \qquad (I)$$

wherein X is a halogen atom selected from a chlorine atom, a bromine atom and an iodine atom, OR is a non-hydrolyzable alkoxy group having a carbon number of 4~20, an aryloxy group or a cycloalkoxy group, R' is an alkyl group having a carbon number of 1~20, an aryl group, a vinyl group or a halogenated alkyl group, m is an integer of 1~4, n is an integer of 0~2, and a sum of n and m is 2~4).

That is, the silane compound according to the invention is an alkoxysilane compound having a non-hydrolyzable alkoxy group. In this case, it is preferable that R is a hydrocarbon residue wherein 3 carbon atoms are bonded to carbon in u position, a hydrocarbon residue wherein a hydrocarbon residue having a carbon number of 1 or more is bonded to carbon in β position, or an aromatic hydrocarbon residue such as phenyl group or toluyl group.

In R', a methyl group, an ethyl group, n-propyl group, t-butyl group and the like may be mentioned as the alkyl group, and a phenyl group, a toluyl group, a naphthyl group and the like may be mentioned as the aryl group, and a chloromethyl group, a bromomethyl group, an iodomethyl group, a chloroethyl group and the like may be mentioned as the halogenated alkyl group.

In the above general formula (I), there are dialkyldialkoxy silane as an example of n=0 and m=2, monoalkyltrialkoxy silane as an example of n=0 and m=3, tetraalkoxy silane as an example of n=0 and m=4, monohalogenated dialkylmonoalkoxy silane as an example of n=1 and m=1, monohalogenated monoalkyldialkoxy silane as an example of n=1 and m=2, monohalogenated trialkoxy silane as an example of n=1 and m=3, dihalogenated monoalkylmonoalkoxy silane as an example of n=2 and m=1 and dihalogenated dialkoxy silane as an example of n=2 and m=2, all of which are compounds having a reactivity with the active terminal, of the living polymer.

Particularly, the monoalkyltriaryloxy silane with n=0 and m=3.and tetraaryloxy silane with n=0 and m=4 are favorable from a viewpoint that the living polymer is coupled to improve the processability and give a functional group having a high affinity with silica or the like to the polymer.

As a concrete example of the silane compounds used in the invention and represented by the general formula (I), there are alkoxy type ones containing no halogen such as tetrakis (2-ethylhexyloxy) silane, tetraphenoxysilane, methyltris (2-ethylhexyloxy) silane, ethyltris (2-ethylhexyloxy) silane, ethyltrisphenoxysilane, vinyltris (2-ethylhexyloxy) silane, ethyltriphenoxysilane, vinyltris (2-ethylhexyloxy) silane, vinyltriphenoxysilane, methylvinylbis (2-ethylhexyloxy) silane, ethylvinylbiphenylsilane, monomethyltriphenoxysilane, dimethyldiphenoxysilane, monoethyltriphenoxysilane, diethyldiphenoxysilane, phenyltriphenoxysilane and diphenyldiphenoxysilane; aryloxy type ones containing no halogen such as tetraphenoxysilane, ethyltriphenoxysilane, vinyltriphenoxysilane, dimethyldiphenoxysilane, monoethyltriphenoxysilane, diethyldiphenoxysilane, phenyltriphenoxysilane and diphenyldiphenoxysilane; non-hydrolyzable alkoxy ones with n=4 containing halogen such as tri-t-butoxymonochlorosilane, dichloro-di-t-butoxysilane, di-t-butoxydiiodosilane and the like; non-hydroxyzable alkoxy ones with n=5 or aryloxy or more containing halogen such as triphenoxymonochlorosilane, monochloromethyldiphenoxysilane, monochloromethylbis (2-ethylhexyloxy) silane, monobromoethyldiphenoxysilane, monobromovinyldiphenoxysilane, monobromoisopropenylbis (2-ethylhexyloxy) silane, ditolyloxydichlorosilane, diphenoxydiiodosilane, methyltris (2-methylbutoxy) silane, vinyltris (2-methylbutoxy) silane, monochloromethylbis (2-methylbutoxy) silane, vinyltris (3-methylbutoxy)silane, tetrakis (2-ethylhexyloxy) silane, tetraphenoxysilane, methyltris (2-ethylhexyloxy) silane, ethyltris (2-ethylhexyloxy) silane, ethyltriphenoxysilane, vinyltris (2-ethylhexyloxy) silane, vinyltriphenoxysilane, methylvinylbis (2-ethylhexyloxy) silane, ethylvinyldiphenoxysilane and the like; aryloxy type ones containing halogen such as triphenoxymonochlorosilane, monochloromethyldiphenoxysilane, monobromoethyldiphenoxysilane, monobromovinylphenoxysilane, ditolyldichlorosilane, diphenoxydiiodosilane and the like.

Among these silane compounds, silane compounds having n=0 or 1, particularly monoethyltriphenoxysilane are preferable. These silane compounds may be used alone or in admixture thereof.

The silane compound-modified rubbery polymer according to the invention is obtained by reacting the silane compound represented by the general formula (I) to the active terminal of the living polymer. In this case, the amount of the silane compound used is not less than 0.7 molecule, preferably 0.7~5.0 molecule, more particularly 0.7~2.0 molecule per one active terminal of the living polymer. When the amount of the silane compound is less than 0.7 molecule, the production amount of branched polymer becomes large and the variation of molecular weight distribution is large and consequently it is difficult to control the molecular weight and the molecular weight distribution, while when it exceeds 5.0 molecule, the effect of improving the properties is saturated and it is unfavorable from the economical viewpoint.

In this case, it is possible to perform two-stage addition of the silane compound, wherein a small amount of the silane compound is first added to the active terminal of the living polymer to form a polymer having a branched structure and then the remaining active terminal is modified with the other silane compound.

According to the invention, the reaction between the active terminal of the living polymer and the silane compound having a functional group is performed by adding the silane compound to the solution of polymerization system for the living polymer, or by adding the solution of the living polymer to the organic solution containing the silane compound.

The reaction temperature is −120°~+150° C., preferably −80°~+120° C., and the reaction time is 1 minute~5 hours, preferably 5 minutes~2 hours.

After the completion of the reaction, the silane compound-modified rubbery polymer can be obtained by blowing a steam into the polymer solution to remove the solvent therefrom, or by adding a poor solvent such as methanol or the like to solidify the silane compound-modified rubbery polymer and then drying the polymer through hot rolls or under reduced pressure.

And also, the silane compound-modified rubbery polymer can be obtained by directly removing the solvent from the polymer solution under a reduced pressure.

Moreover, the molecular weight of the silane compound-modified rubbery polymer according to the invention can be varied over a wide range. However, it is preferable to have a Mooney viscosity ($ML_{1+4}$, 100° C.) of 10~150. When the Mooney viscosity is less than 10, the tensile properties are poor, while when it exceeds 150, the processability is undesirably poor.

When the silane compound-modified rubbery polymer according to the invention is a copolymer, it may be taken in form of block copolymer or random copolymer in accordance with the structure of the living polymer.

The structure of the silane compound-modified rubbery polymer according to the invention can be confirmed, for example, by an absorption near to 1,100 $cm^{-1}$ resulting from Si—O—C bond, an absorption near to 1,250 $cm^{-1}$ resulting from Si—O—Φ bond, an absorption near to 1,160 $cm^{-1}$ resulting from Si—C bond or the like through an infrared absorption spectrum.

The silane compound-modified rubbery polymer according to the invention is used alone or by blending with natural rubber, cis-1,4-polyisoprene, emulsion-polymerized styrene-butadiene copolymer, solution-polymerized styrene-butadiene copolymer, low cis 1,4- polybutadiene, high cis-1,4-polybutadiene, ethylenepropylene-diene terpolymer, chloroprene, halogenated butyl rubber, NBR or the like as a rubber composition. In this case, the amount of the rubbery polymer used (rubber weight percentage) is necessary to be not less than 10% by weight, preferably 20% by weight as a rubber ingredient. When the rubber weight percentage is less than 10% by weight, the improving effect for silica reinforcement is not recognized.

Furthermore, a white filler, preferably silica is an essential component as a filler to be compounded with the silane compound-modified rubbery polymer according to the invention.

The amount of silica compounded is 5~200 parts by weight, preferably 20~100 parts by weight based on 100 parts by weight of the rubber ingredient. When the amount of silica is less than 5 parts by weight, the reinforcing effect of the filler is small, while when it exceeds 200 parts by weight, the processability and the fracture properties are poor.

Moreover, when the rubber composition used in the invention is used as a tread rubber for the tire, if carbon black and silica are used together as a filler, the processability, wear resistance, cut resistance and anti-skid property can be further improved as compared with a case of using silica alone. In this case, the weight ratio of carbon black/silica is preferable to be within a range 95/5~10/90 in view of the holding or improving of the wear resistance. However, silica may be used alone if the somewhat reduction of the wear resistance can be ignored while importantly considering the appearance and the anti-skid property on wet and ice roads.

In the production of the rubber composition used in the invention, it is preferable that the silane compound-modified rubbery polymer is compounded with silica, while the other rubber is compounded with carbon black, and then both the rubber ingredients are kneaded with other additives, whereby the fillers can selectively be dispersed in rubber to provide desirable tire performances. For example, ① when a rubber composition obtained by kneading a mixture of silane compound-modified styrene-butadiene rubber and silica and a mixture of butadiene rubber and carbon black with other rubber additives is used as a tire tread, the anti-skid property and the wear resistance are excellent, ② when a rubber composition obtained by kneading a mixture of silane compound-modified butadiene rubber and silica with a mixture of natural rubber and carbon black is used in a tire, the heat build up and the wear resistance are excellent, so that this rubber composition is suitable for large size tires such as truck tire and bus tire, and ③ when a rubber composition obtained by kneading a mixture of silane compound-modified styrene-butadiene rubber and silica with a mixture of natural rubber and carbon black is used in a tire, the cut resistance and heat build-up are excellent, so that this rubber composition is suitable for construction tire and solid tire.

Furthermore, when the silane compound-modified rubbery polymer alone or a blend with other rubber is used together with silica and carbon black as a sidewall rubber in a tire, the resistance to the damaging due to rubbing on curbstone is improved as compared with a case of using silica alone, while the rolling resistance is improved as compared with a case of using carbon black alone.

Moreover, when a rubber composition obtained by compounding silica and, if necessary, a white filler such as titanium white or the like with the silane compound-modified rubbery polymer is used as a white sidewall rubber, the resistance to external injury increases as compared with the tire using rubber not modified with the silane compound as a white sidewall rubber.

On the other hand, the rubber composition according to the invention is high in the stress at microdeformation, so that when it is applied to a portion requiring the synthesis of microdeformation in the tire, for example, a bead filler, the cornering power can be increased. Furthermore, when the rubber composition according to the invention is used to a base rubber in a tire tread of cap/base structure, since the hardness is high and the heat build-up is low, the tire having a large steering stability and a low rolling resistance can be obtained, which has never been achieved by increasing or decreasing the amount of carbon black in the conventional technique. And also, when the rubber composition according to the invention is used as a rubber for embedding tire cords, since the heat build-up is low, the hysteresis loss due to dynamic repetitive deformation applied to the tire cord and the embedding rubber can be reduced, and consequently tires having a low rolling resistance and a high durability can be obtained.

Moreover, the rubber composition according to the invention may be compounded with a powdery filler such as magnesium carbonate, calcium carbonate, clay or the like, a fibrous filler such as glass fiber, whisker or the like, zinc white, an antioxidant, and an ordinary additive such as vulcanization accelerator, vulcanizing agent or the like, if necessary.

Further, the above rubber composition may be compounded with dibutyltin diacetate, dibutyltin dioctoate, dibutyltin laurate, titanous acetate, ferrous octanoate, lead naphthanate, zinc caprirate, iron 2-ethylhexanoate, cobalt naphthanate, titanoic acid ester or a chelate compound, which is known as a silanol condensating agent.

As mentioned above, the rubber composition used in the invention can be applied to all portions constituting the tire, for example, tread, undertread, sidewall, belt, carcass, bead portion and the like, whereby the tire performances can considerably be improved. Furthermore, the tire performances can be improved even when the rubber composition is used as a rubber chafer rubber, a shoulder wedge rubber, a sandwich sheet rubber, a cushion rubber or the like of the tire.

Best Mode of Carrying out the Invention

The following examples are given in illustration of the invention and are not intended to limitations thereof.

In the examples, part and % mean part by weight and % by weight unless otherwise specified.

Furthermore, various measurements in the examples were carried out according to the following methods.

That is, the reaction between the active terminal of the living polymer and the silane compound was confirmed by the change of Mooney viscosity in the polymer before and after the reaction and the change of infrared absorption spectrum.

The Mooney viscosity was measured at a temperature of 100° C. over 4 minutes after the preheating for 1 minute.

The microstructure of butadiene portion was determined by an infrared absorption spectroscopy (Morero's method).

The content of bound styrene was measured from the predetermined calibration curve by an infrared absorption spectroscopy based on an absorption of phenyl group of 699 cm$^{-1}$.

The glass transition temperature (Tg) was measured from the predetermined calibration curve by using a low temperature DSC body of CN8208A2 model made by Rigaku Denki K.K.; a low temperature DSC DTA unit of CN8059L2 model; and a program temperature controller of PTC-10A model.

The properties of vulcanizate were measured according to a method of JIS K6301.

The Lambourn abrasion index was measured by means of a Lambourn abrasion tester. The measurement conditions were a loading of 4.5 kg, a surface speed of a whetstone of 100 m/sec, a speed of a test specimen of 130 m/sec, a slipping ratio of 30% and a dropping rate of sand of 20 g/min, and the measuring temperature was room temperature.

The Lambourn abrasion index was represented on the basis that styrene-butadiene copolymer not modified with the silicon compound (vinyl content=60%, styrene content=20%) was 100. The larger the index value, the better the wear resistance.

The internal loss (tan δ) was measured by using a viscoelastic spectrometer made by Iwamoto Seisakusho K.K. under conditions that the dynamic tensile strain was 1%, the frequency was 10 Hz and the temperature was 50° C. Moreover, a slab sheet having a thickness of about 2 mm and a width of 5 mm was used as a test specimen, and the space for sandwiching the specimen was 2 cm and the initial loading was 100 g.

The index of the rolling resistance was evaluated according to the following equation based on a value calculated from inertia moment by placing the tire on a drum of 1.7 m in outer diameter, rotating the drum, raising the rotating speed to a certain value, and stopping the rotating of the drum to run the tire by inertia:

$$\frac{\text{Inertia moment of control tire}}{\text{Inertia moment of test tire}} \times 100$$

The anti skid property on wet road surface (wet skid property) in the test tire was evaluated according to the following equation from a value obtained by measuring a distance for stopping the vehicle by rapid braking at a running speed of 80 km/h on a wet concrete road surface having a water depth of 3 mm:

$$\frac{\text{Stopping distance of control tire}}{\text{Stopping distance of test tire}} \times 100$$

The resistance to slipping on ice road was represented by an index according to the same equation as in the anti skid property from a value obtained by measuring a distance for stopping the vehicle by rapid braking at a running speed of 80 km/h on an ice road at a surface temperature of −20° C.:

$$\frac{\text{Stopping distance of control tire}}{\text{Stopping distance of test tire}} \times 100$$

The index of wear resistance was evaluated according to the following equation from an average value obtained by measuring the remaining groove depth at 10 positions after the tire was actually run over a distance of 40,000 km:

$$\frac{\text{Depth of remaining groove in test portion}}{\text{Depth of remaining groove in control portion}} \times 100$$

The heat generating temperature of the drum was determined by measuring a surface temperature of a central portion of the tread after the test tire was inflated under normal internal pressure, placed on a drum tester of 1.7 m in outer diameter under a normal loading and then run at a speed of 60 km/h for 3 hours.

The index of cut resistance was evaluated by measuring large cut number (cut damage having a depth of not less than 5 mm) and small cut number (cut damage having a depth of not less than 1 mm but less than 5 mm) per 100 cm$^2$ of tread surface after the vehicle was run on bad road having many protruding stones such as stone pit or the like. The larger the index value, the better the cut resistance.

The steering stability was tested and evaluated according to a method of ASTM F516-77.

The wear resistance of the sidewall was evaluated by an index by measuring the worn amount after the tire was run on a test course over a certain distance. The larger the index value, the better the property.

The resistance to external damaging in the sidewall was represented by an index by measuring the depth of cut after a stainless steel knife was struck to a rubber block of the tire sidewall portion from a certain height by means of a pendulum type impact cut testing machine. The larger the value, the better the resistance to external damaging.

The bead durability was evaluated by measuring a length of crack in the bead portion after the test tire was inflated under a normal internal pressure, placed on a drum tester of 1.8 m in outer diameter under a normal loading and run at a speed of 70 km/h over a distance of 10,000 km and then represented by an index according to the following equation:

$$\frac{\text{Crack length of control tire}}{\text{Crack length of test tire}} \times 100$$

The heat generating temperature of the belt was evaluated by measuring the temperature of the belt after the test tire was inflated under a normal internal pressure, placed on a drum tester of 1.7 m in outer diameter under a normal loading and run at a speed of 60 km/h for 3 hours.

REFERENCE EXAMPLE 1

An autoclave of 5 l capacity provided with a stirrer and a jacket was dried and purged with nitrogen. Into the autoclave were charged 2,500 g of previously purified and dried cyclohexane, 100 g of styrene, 400 g of 1,3-butadiene and 25 g of tetrahydrofuran. After the temperature of the autoclave was adjusted to 10° C. and the flowing of cooling water was stopped, 0.300 g of n-butyllithium was added with stirring at 2 revolutions per minute to conduct polymerization for 30 minutes. A part of the resulting polymer solution was taken out and measured with respect to a Mooney viscosity (ML$_{1+4}$, 100° C.) to obtain the viscosity of not more than 14.

Then, the remaining polymer solution was added with 9.38 ml of a solution of monomethyltriphenoxysilane in cyclohexane (concentration 0.50 mol/l, mol ratio of monomethyltriphenoxysilane to n-butyllithium corresponded to 1.00), whereby the yellowish red color of the living anion was disappeared and the viscosity of the solution was increased. The solution was further reacted at 50° C. for 30 minutes.

After the lapse of given time, 2,6-di-t-butylphenol (BHT) was added in an amount of 0.7 g per 100 g of the polymer, and dried through hot rolls of 100° C. after steam desolvation. The yield of the polymer was obtained substantially quantitatively.

The polymer yield even in the following reference examples was quantitative.

Even when the polymer was dissolved in tetrahydrofuran, there was no insoluble matter. Furthermore, this modified polymer had an absorption based on Si—O—Φ bond of 1,250 cm$^{-1}$ through an infrared absorption spectrum.

On the other hand, when the polymer was shaped through hot rolls and subjected to steam treatment under the same conditions as mentioned above, the Mooney viscosity was 43 substantially similar to that before the treatment.

The silane compound-modified rubbery polymer of this example was vulcanized according to the following compounding recipe, and the properties of the resulting vulcanizate were evaluated. That is, the polymer was preliminarily kneaded with silica, DBTDL, stearic acid and zinc oxide through hot rolls of 145° C., and then kneaded with the remaining additives through rolls of 50° C.

The kneaded mass was shaped and press vulcanized at 145° C. The vulcanization was carried out in the same manner even in the following reference examples. The results in this example are shown in the following Table 1.

| Compounding recipe | (part) |
|---|---|
| polymer | 100 |
| silica | 40 |
| (made by Nippon Silica K.K., Nipsil VN3) | |
| stearic acid | 2 |
| zinc oxide | 3 |
| antioxidant; 810NA*[1] | 1 |
| antioxidant; TP*[2] | 0.8 |
| vulcanization accelerator; D*[3] | 0.6 |
| vulcanization accelerator; DM*[4] | 1.2 |
| sulfur | 1.5 |
| triethanolamine | 1.5 |
| DBTDL*[5] | 1.0 |
| total | 151.1 |

*[1] N-phenyl-N'-isopropyl-p-phenylenediamine
*[2] sodium dibutyldithiocarbamate
*[3] diphenylguanidine
*[4] dibenzothiazyldisulfide
*[5] dibutyltin dilaurate REFERENCE EXAMPLES Examples 2~8

The modification of styrene-butadiene copolymer was carried out in the same manner as in Reference Example 1 except that the silane compound shown in Table 1 was used instead of the monomethyltriphenoxysilane used in Reference Example 1. The polymerization results and the properties of the vulcanized polymer are also shown in Table 1.

REFERENCE EXAMPLE 9

The same modification of styrene-butadiene copolymer as in Reference Example 1 was carried out except that the amount of monomethyltriphenoxysilane used was a half of that in Reference Example 1. The polymerization results and the properties in the vulcanized polymer are shown in Table 1.

COMPARATIVE REFERENCE EXAMPLES 1, 2

The same polymer as in Reference Example 1 was produced except that monochlorotriethyoxysilane and methylethoxysilane were used instead of monomethyltriphenoxysilane of Reference Example 1. The polymerization results and the properties of the vulcanized polymer are shown in Table 1.

COMPARATIVE REFERENCE EXAMPLE 3

The same polymer as in Reference Example 1 was produced except for no modification with the silane compound. The polymerization results and the properties of the vulcanized polymer are shown in Table 1.

The resulting polymers were hydrolyzed by the steam treatment to increase the Mooney viscosity, from which it was clear that the resulting rubber has a high hydrolyzability. Furthermore, it was clear that monomethyltriphenoxysilane peculiarly acts to the improvement of tensile strength and Lambourn abrasion index from the comparison of Reference Example 1 with Comparative Reference Examples 1~3.

TABLE 1

| | Reference Example 1 monomethyl-triphenoxy-silane | Reference Example 2 tetra-phenoxy-silane | Reference Example 3 diethylbis(2-ethylhexyloxy)silane | Reference Example 4 methylvinylbis(2-ethylhexyloxy)silane | Reference Example 5 dichloro-diphenoxy-silane | Reference Example 6 monochloro-methyldiphenoxy-silane |
|---|---|---|---|---|---|---|
| Kind of silane compound | | | | | | |
| Silane compound/n-butyllithium (mol ratio) | 1.0 | 1.0 | 1.0 | 1.0 | 1.0 | 1.0 |
| Mooney viscosity before addition of silane compound (ML$_{1+4}$, 100° C.) | 14 | not more than 10 | 16 | 17 | not more than 10 | 18 |
| Mooney viscosity after addition of silane compound (after drying under reduced pressure) | 40 | 37 | 40 | 36 | 39 | 37 |
| Mooney viscosity after addition of silane compound (after steam solidification and drying through hot rolls) | 43 | 39 | 43 | 44 | 43 | 40 |
| Microstructure | | | | | | |
| vinyl content (%) | 61 | 61 | 62 | 60 | 60 | 61 |
| styrene content (%) | 20 | 20 | 20 | 19 | 20 | 22 |
| Glass transition temperature | −45 | −45 | −46 | −43 | −44 | −45 |

TABLE 1-continued

| through DSC analysis (°C.) | | | | | | |
|---|---|---|---|---|---|---|
| Vulcanization properties | | | | | | |
| tensile properties | | | | | | |
| 200% modulus (kgf/cm$^2$) | 51 | 50 | 49 | 50 | 48 | 43 |
| 300% modulus (kgf/cm$^2$) | 87 | 84 | 82 | 83 | 80 | 85 |
| tensile strength (kgf/cm$^2$) | 242 | 235 | 225 | 211 | 231 | 228 |
| elongation at break (%) | 580 | 585 | 582 | 581 | 580 | 595 |
| hardness (JIS-A) | 71 | 70 | 70 | 69 | 70 | 70 |
| Lambourn abrasion index* | 211 | 205 | 180 | 178 | 189 | 198 |
| tan δ (50° C.) | 0.1021 | 0.1030 | 0.1088 | 0.1101 | 0.1100 | 0.1091 |

| | Reference Example 7 monochloromethyl-bis(2-ethylhexyloxy) silane | Reference Example 8 monochloromethyl-bis(2-methylbutoxy) silane | Comparative Reference Example 1 monochloro-triethoxy-silane | Comparative Reference Example 2 methyl-triethoxy-silane | Comparative Reference Example 3 no modification | Reference Example 9 monomethyl-triphenoxy-silane |
|---|---|---|---|---|---|---|
| Kind of silane compound | | | | | | |
| Silane compound/n-butyllithium (mol ratio) | 1.0 | 1.0 | 1.0 | 1.0 | — | 0.5 |
| Mooney viscosity before addition of silane compound (ML$_{1+4}$, 100° C.) | 17 | 15 | not more than 10 | 15 | 40 | 12 |
| Mooney viscosity after addition of silane compound (after drying under reduced pressure) | 38 | 39 | 30 | 32 | — | 41 |
| Mooney viscosity after addition of silane compound (after steam solidification and drying through hot rolls) | 43 | 44 | 53 | 54 | — | 43 |
| Microstructure | | | | | | |
| vinyl content (%) | 61 | 60 | 62 | 61 | 60 | 62 |
| styrene content (%) | 21 | 20 | 21 | 21 | 21 | 21 |
| Glass transition temperature through DSC analysis (°C.) | −47 | −45 | −47 | −48 | −46 | −44 |
| Vulcanization properties | | | | | | |
| tensile properties | | | | | | |
| 200% modulus (kgf/cm$^2$) | 52 | 50 | 52 | 53 | 33 | 47 |
| 300% modulus (kgf/cm$^2$) | 75 | 77 | 65 | 68 | 47 | 80 |
| tensile strength (kgf/cm$^2$) | 208 | 209 | 169 | 172 | 148 | 202 |
| elongation at break (%) | 510 | 525 | 450 | 440 | 400 | 520 |
| hardness (JIS-A) | 69 | 70 | 73 | 72 | 70 | 70 |
| Lambourn abrasion index* | 148 | 152 | 110 | 107 | 100 | 147 |
| tan δ (50° C.) | 0.1082 | 0.1123 | 0.1706 | 0.1675 | 0.1822 | 0.1134 |

*represented by an index on the basis that the result of Comparative Reference Example 3 was 100. The larger the numerical value, the better the property.

REFERENCE EXAMPLE 10

An autoclave of 5 l capacity provided with a stirrer and a jacket was dried and purged with nitrogen. Into the autoclave were charged 2,500 g of previously purified and dried cyclohexane, 500 g of 1,3-butadiene and 25 g of tetrahydrofuran. After the temperature of the autoclave was adjusted to 10° C. and the flowing of cooling water was stopped, 0.300 g of n-butyllithium was added with stirring at 2 revolutions per minute to conduct polymerization for 30 minutes. A part of the resulting polymer solution was taken out and measured with respect to a Mooney viscosity (ML$_{1+4}$, 100° C.) to obtain the viscosity of not more than 10.

Then, the remaining polymer solution was added with 9.38 ml of a solution of monomethyltriphenoxysilane in cyclohexane (concentration 0.50 mol/l, mol ratio of monomethyltriphenoxysilane to n-butyllithium corresponded to 1.00), whereby the yellowish red color of the living anion was disappeared and the viscosity of the solution was increased. The solution was further reacted at 50° C. for 30 minutes.

After the lapse of given time, 2,6-di-t-butylphenol (BHT) was added in an amount of 0.7 g per 100 g of the polymer, and dried through hot rolls of 100° C. after steam desolation. The yield of the polymer was obtained substantially quantitatively.

The polymer yield even in the following Reference Example 11 and Comparative Reference Examples 4, 5 was quantitative. Even when the polymer was dissolved in tetrahydrofuran as in Reference Example 1, there was no insoluble matter. Furthermore, this modified polymer had an absorption based on Si—O—Φ bond of 1,250 cm$^{-1}$ through an infrared absorption spectrum.

Then, the polymer was evaluated in the same manner as in Reference Example 1 and also the vulcanizate was prepared. The results of the polymer and the properties of the vulcanizate are shown in Table 2.

REFERENCE EXAMPLE 11

The modification of polybutadiene was performed in the same manner as in Reference Example 10 except that tetraphenoxysilane was used instead of monomethyltriphenoxysilane of Reference Example 10. The polymerization results and the properties of the vulcanized polymer are shown in Table 2.

COMPARATIVE REFERENCE EXAMPLE 4

The polymer was produced in the same manner as in Reference Example 10 except that monochlorotriethoxysilane was used instead of monomethyltriphenoxysilane of Reference Example 10. The polymerization results and the properties of the vulcanized polymer are shown in Table 2.

COMPARATIVE REFERENCE EXAMPLE 5

The polymer was produced in the same manner as in Reference Example 10 except for no modification with the silane compound. The polymerization results and the properties of the vulcanized polymer are shown in Table 2.

In Table 3, the silane compound modified rubbery polymer a was the polymer obtained in Reference Example 1, and the polymer b was the polymer obtained in Reference Example 10. On the other hand, the polymer a' not modified with the silane compound in Table 3 was the polymer of Comparative Reference Example 3 obtained in the same manner as in Reference Example 1

TABLE 2

| Kind of silane compound | Reference Example 10 monomethyl-triphenoxy-silane | Reference Example 11 tetra-phenoxy-silane | Comparative Reference Example 4 monochloro-triethoxy-silane | Comparative Reference Example 5 no modification |
|---|---|---|---|---|
| Silane compound/n-butyllithium (mol ratio) | 1.0 | 1.0 | 1.0 | — |
| Mooney viscosity before addition of silane compound ($ML_{1+4}$, 100° C.) | not more than 10 | not more than 10 | not more than 10 | not more than 40 |
| Mooney viscosity after addition of silane compound (after drying under reduced pressure) | 41 | 40 | 25 | — |
| Mooney viscosity after addition of silane compound (after steam solidification and drying through hot rolls) | 45 | 43 | 64 | — |
| Microstructure | | | | |
| vinyl content (%) | 31 | 32 | 32 | 30 |
| styrene content (%) | 0 | 0 | 0 | 0 |
| Glass transition temperature through DSC analysis (°C.) | −98 | −97 | −99 | −97 |
| Vulcanization properties | | | | |
| tensile properties | | | | |
| 200% modulus (kgf/cm$^2$) | 39 | 40 | 34 | 28 |
| 300% modulus (kgf/cm$^2$) | 69 | 63 | 48 | 45 |
| tensile strength (kgf/cm$^2$) | 187 | 179 | 157 | 134 |
| elongation at break (%) | 579 | 570 | 560 | 430 |
| hardness (JIS-A) | 60 | 61 | 59 | 59 |
| Lambourn abrasion index* | 188 | 179 | 148 | 100 |
| tan δ (50° C.) | 0.0742 | 0.0783 | 0.0891 | 0.0911 |

*represented by an index on the basis that the result of the Comparative Reference Example 5 was 100. The larger the numerical value, the better the property.

COMPARATIVE TEST EXAMPLES 1~6 AND TEST EXAMPLES 1~8

The vulcanization was carried out in the same manner as in Reference Example 1 by using the rubbery polymer obtained in Reference Example 1 or Reference Example 10 according to a compounding recipe as shown in Table 3 and the properties were evaluated. The results are shown in Table 3.

except for no modification with the silane compound [Mooney viscosity ($ML_{1+4}$, 100° C.): 40, vinyl content: 60%, styrene content: 21%, glass transition temperature: −46° C.)], and the polymer b' was the polymer of Comparative Reference Example 5 obtained in the same manner as in Reference Example 10 except for no modification with the silane compound [Mooney viscosity ($ML_{1+4}$, 100° C.): 40, vinyl content: 30%, glass transition temperature: −97° C.].

TABLE 3

| | Comparative Test Example 1 | Test Example 1 | Comparative Test Example 2 | Comparative Test Example 3 | Test Example 2 | Test Example 3 | Test Example 4 | Test Example 5 |
|---|---|---|---|---|---|---|---|---|
| Compounding recipe (part) | | | | | | | | |
| silane compound-modified rubbery polymer | — | a (100) | a (100) | a (80) | a (80) | a (50) | a (100) | a (100) |
| silane compound-unmodified rubbery polymer | a' (100) | — | — | — | — | — | — | — |
| natural rubber | — | — | — | — | 20 | — | — | — |
| SBR (made by Japan Synthetic Rubber Co., Ltd., #1500) | — | — | — | 20 | — | 50 | — | — |
| SBR (made by Japan Synthetic Rubber Co., Ltd., #01) | — | — | — | — | — | — | — | — |
| silica (made by Nippon Silica K.K, Nipsil VN3) | 50 | 50 | 3 | 210 | 50 | 50 | 80 | 20 |
| carbon black (HAF) | — | — | — | — | — | — | — | — |
| stearic acid | 2 | 2 | 2 | 2 | 2 | 2 | 2 | 2 |
| zinc oxide | 3 | 3 | 3 | 3 | 3 | 3 | 3 | 3 |
| antioxidant; 810NA | 1 | 1 | 1 | 1 | 1 | 1 | 1 | 1 |

TABLE 3-continued

| | | | | | | | | |
|---|---|---|---|---|---|---|---|---|
| antioxidant; TP | 0.8 | 0.8 | 0.8 | 0.8 | 0.8 | 0.8 | 0.8 | 0.8 |
| vulcanization accelerator; D | 0.6 | 0.6 | 0.6 | 0.6 | 0.6 | 0.6 | 0.6 | 0.6 |
| vulcanization accelerator; DM | 1.2 | 1.2 | 1.2 | 1.2 | 1.2 | 1.2 | 1.2 | 1.2 |
| sulfur | 1.5 | 1.5 | 1.5 | 1.5 | 1.5 | 1.5 | 1.5 | 1.5 |
| triethanolamine | 1.5 | 1.5 | 1.5 | 1.5 | 1.5 | 1.5 | 1.5 | 1.5 |
| DBTDL | 1.0 | 1.0 | 1.0 | 1.0 | 1.0 | 1.0 | 1.0 | 1.0 |
| cobalt naphthanate | — | — | — | — | — | — | — | — |
| Vulcanization properties | | | | | | | | |
| tensile strength (kgf/cm$^2$) | 181 | 220 | 66 | 160 | 235 | 200 | 201 | 147 |
| elongation at break (%) | 605 | 551 | 853 | 220 | 560 | 625 | 508 | 883 |
| 300% modulus (kgf/cm$^2$) | 61 | 82 | 21 | — | 80 | 76 | 95 | 55 |
| hardness (JIS-A) | 70 | 73 | 42 | 98 | 72 | 70 | 78 | 61 |
| tan δ (50° C.) | 0.1375 | 0.1085 | 0.0765 | 0.1830 | 0.0996 | 0.1123 | 0.1351 | 0.0893 |

| | Test Example 6 | Test Example 7 | Comparative Test Example 4 | Test Example 8 | Comparative Test Example 5 | Test Example 9 | Comparative Test Example 6 | Comparative Test Example 7 |
|---|---|---|---|---|---|---|---|---|
| Compounding recipe (part) | | | | | | | | |
| silane compound-modified rubbery polymer | a (100) | a (100) | — | b (50) | — | b (30) | — | a (100) |
| silane compound-unmodified rubbery polymer | — | — | a' (100) | — | b' (50) | — | b' (30) | — |
| natural rubber | — | — | — | 50 | 50 | 70 | 70 | — |
| SBR (made by Japan Synthetic Rubber Co., Ltd., #1500) | — | — | — | — | — | — | — | — |
| SBR (made by Japan Synthetic Rubber Co., Ltd., #01) | — | — | — | — | — | — | — | — |
| silica (made by Nippon Silica K.K, Nipsil VN3) | 30 | 20 | — | 35 | — | 20 | 20 | — |
| carbon black (HAF) | 20 | 30 | 50 | — | 35 | 35 | 35 | 50 |
| stearic acid | 2 | 2 | 2 | 2 | 2 | 2 | 2 | 2 |
| zinc oxide | 3 | 3 | 3 | 3 | 3 | 3 | 3 | 3 |
| antioxidant; 810NA | 1 | 1 | 1 | 1 | 1 | 1 | 1 | 1 |
| antioxidant; TP | 0.8 | 0.8 | 0.8 | 0.8 | 0.8 | 0.8 | 0.8 | 0.8 |
| vulcanization accelerator; D | 0.6 | 0.6 | 0.6 | 0.6 | 0.6 | 0.6 | 0.6 | 0.6 |
| vulcanization accelerator; DM | 1.2 | 1.2 | 1.2 | 1.2 | 1.2 | 1.2 | 1.2 | 1.2 |
| sulfur | 1.5 | 1.5 | 1.5 | 1.5 | 1.5 | 6 | 6 | 1.5 |
| triethanolamine | 1.5 | 1.5 | 1.5 | 1.5 | 1.5 | 1.5 | 1.5 | 1.5 |
| DBTDL | 1.0 | 1.0 | 1.0 | 1.0 | 1.0 | 1.0 | 1.0 | 1.0 |
| cobalt naphthanate | — | — | — | — | — | 2 | 2 | — |
| Vulcanization properties | | | | | | | | |
| tensile strength (kgf/cm$^2$) | 210 | 247 | 269 | 188 | 185 | 266 | 250 | 271 |
| elongation at break (%) | 501 | 502 | 439 | 811 | 530 | 280 | 271 | 412 |
| 300% modulus (kgf/cm$^2$) | 93 | 109 | 122 | 68 | 95 | — | — | 119 |
| hardness (JIS-A) | 69 | 68 | 67 | 65 | 51 | 79 | 78 | 67 |
| tan δ (50° C.) | 0.1290 | 0.1252 | 0.1400 | 0.0995 | 0.1241 | 0.0864 | 0.1023 | 0.1394 |

EXAMPLE 1

A tire having a tire size of 165 SR13 was manufactured by using the rubber composition of Comparative Test Example 1, 4 or 7 or Test Example 1 or 7 as a tread rubber, and the index of rolling resistance, anti skid property on wet road surface, resistance to slipping on ice road and index of wear resistance were evaluated. The results are shown in Table 4.

TABLE 4

| Kind of tread rubber | Tire A Comparative Test Example 4 | Tire B Comparative Test Example 1 | Tire C Test Example 1 | Tire D Test Example 7 | Tire E Comparative Test Example 7 |
|---|---|---|---|---|---|
| index of rolling resistance | 100 | 105 | 114 | 111 | 100 |
| anti-skid property on wet road surface | 100 | 106 | 110 | 110 | 100 |
| resistance to slipping on ice road | 100 | 113 | 115 | 111 | 100 |
| index of wear resistance | 237 | 100 | 220 | 230 | 232 |

As seen from Table 4, the tire A using the rubber composition containing the conventional silane compound-unmodified rubbery polymer a' and carbon black as a filler is insufficient in the rolling resistance, anti-skid property on wet road surface and resistance to slipping on ice road, while the tire B using the rubber composition containing the polymer a' and silica as a filler improves the rolling resistance, anti-skid property on wet road surface and resistance to slipping on ice road but is considerably poor in the wear resistance, so that they are not applied for practical use. On the contrary, the tire C using the rubber composition containing silane compound-modified rubbery polymer and silica is recognized to have the improving effect for all properties as compared with the tire B, and the wear resistance is somewhat poor as compared with the tire A using carbon black as a filler but is still sufficient in the practical use, so that the effect of using the silane compound-modified rubbery polymer as a rubber ingredient is sufficiently recognized. Furthermore, the tire D using the rubber composition containing silica and carbon black as a filler in addition to the silane compound-modified rubbery polymer improves the rolling resistance and the resistance to slipping on road surface and has a wear resistance approximately equal to that of the tire A, so that it is suitable as an all-season tire.

Moreover, the tire E using the rubber composition containing the silane compound-modified rubbery polymer and only carbon black as a filler has properties equal to those of the tire using the unmodified rubbery polymer, from which it is apparent that the modification effect can not be developed in this tire.

EXAMPLE 2

A tire for truck and bus with a size of 10.00–20 was manufactured by dividing the tread into a cap/base structure and using the rubber composition of Comparative Test Example 4 or Test Example 7 as a tread cap rubber, and the heat generating temperature on drum and the index of cut resistance were evaluated. The results are shown in Table 5.

TABLE 5

| Kind of tread rubber | Tire F Comparative Test Example 4 | Tire C Test Example 7 | Tire H Comparative Test Example 1 | Tire I Comparative Test Example 7 |
| --- | --- | --- | --- | --- |
| Heating generating temperature on drum | control | −8° C. as compared with control | −3° C. as compared with control | 0° C. as compared with control |
| index of cut resistance | 100 | 114 | 85 | 100 |

As seen from Table 5, the tire G using the rubber composition containing the silane compound-modified rubbery polymer and silica and carbon black as a tread is suitable as a heavy duty tire running on bad road because the cut resistance and heat build-up are improved.

On the contrary, the tire I using the rubber composition containing only carbon black as an inorganic filler in addition to the silane compound-modified rubbery polymer is equal to a case of using the unmodified rubbery polymer and the modification effect can not be expected.

EXAMPLE 3

A tire for passenger car having a tread of cap/base structure and a size of 165 SR13 was manufactured by using the rubber composition of Test Example 8 or Comparative Test Example 5 as a tread base rubber, and the properties were evaluated. The results are shown in Table 6.

TABLE 6

| Kind of tread base rubber | Tire J Comparative Test Example 5 | Tire K Test Example 8 |
| --- | --- | --- |
| index of rolling resistance | 100 | 109 |
| Steering stability (index of cornering power) | 100 | 104 |
| index of wear resistance | 100 | 106 |

As seen from Table 6, the rolling resistance, steering stability and wear resistance in the tire K using the rubber composition according to the invention are improved as compared with the conventional tire J. Since the tire of this example has the tread of two-layer structure, if the thickness of the tread base rubber is properly selected, it is a clearly distinguishable slip sign. Although this example shows a tire for passenger car, if the rubber composition of this example is used as a tread base rubber for a large size tire such as truck and bus tire and construction tire, the heat build-up and cut resistance can be improved.

EXAMPLE 4

A passenger car tire of 165 SR13 was manufactured by using the rubber compositions of Test Examples 1 and 7 and Comparative Test Examples 1 and 4 as a sidewall rubber, and the properties were evaluated. The results are shown in Table 7.

TABLE 7

| Kind of sidewall rubber | Tire L Comparative Test Example 1 | Tire M Comparative Test Example 4 | Tire N Test Example 1 | Tire O Test Example 7 |
| --- | --- | --- | --- | --- |
| index of rolling resistance | 102 | 100 | 108 | 104 |
| index of wear resistance | 46 | 100 | 80 | 98 |
| resistance to external damaging in sidewall | 85 | 100 | 103 | 110 |

As seen from Table 7, the rolling resistance, index of wear resistance and resistance to external damaging are improved in the tire using the rubber composition according to the invention.

EXAMPLE 5

A passenger car tire of 165 SR13 was manufactured by using the rubber compositions of Test Example 1 and Comparative Test Example 4 as a bead filler. The evaluation results are shown in Table 8.

TABLE 8

| Kind of bead filler rubber | Tire P Comparative Test Example 4 | Tire Q Test Example 1 |
| --- | --- | --- |
| index of rolling resistance | 100 | 107 |
| Steering stability (index of cornering power) | 100 | 106 |
| index of bead durability on drum | 100 | 104 |

As seen from Table 8, the rolling resistance, steering stability and durability are improved in the tire using the rubber composition according to the invention.

EXAMPLE 6

A passenger car tire of 165 SR13 having two steel cord belt layers was manufactured by using the rubber compositions of Comparative Text Example 6 and Test Example 9 as a coating rubber for the steel cord, and the properties were evaluated. The results are shown in Table 9.

TABLE 9

| Kind of coating rubber for steel cord | Tire R Comparative Test Example 6 | Tire S Test Example 9 |
|---|---|---|
| index of rolling resistance | 100 control | 105 |
| Heat generating temperature of belt portion on drum | | −10° C. as compared with control |

As seen from Table 9, the rolling resistance and heat build-up are improved in the tire using the rubber composition according to the invention.

Industrial Applicability

According to the invention, the simultaneous improvement of the tire performances such as wear resistance, cut resistance, heat build-up and the like, which was difficult in the conventional technique, and the improvement of the processability can economically be achieved by applying to a tire a rubber composition having sufficiently high tensile strength and wear resistance even in a vulcanizate containing silica or the like as a white filler without using a large amount of a reinforcing agent such as the conventional silane coupling agent or the like.

We claim:

1. A tire, characterized in that a rubber composition comprising:
    (A) as a rubber ingredient, not less than 10% by weight of a polymer rubber modified with a silane compound obtained by reacting an active terminal of a living polymer, which is obtained by polymerizing an unsaturated monomer in the presence of an organic alkali metal catalyst, with a silane compound represented by the following general formula:

$$X_n Si(OR)_m R'_{4-m-n}$$

wherein X is a halogen atom selected from a chlorine atom, a bromine atom and an iodine atom, OR is a non-hydrolyzable alkoxy group having a carbon number of 4~20, a non-hydrolyzable aryloxy group or a non-hydrolyzable cycloalkoxy group, R' is an alkyl group having a carbon number of 1~20, an aryl group, a vinyl group or a halogenated alkyl group, m is an integer of 1~4, n is an integer of 0~2, and a sum of n and m is 2~4; and
    (B) 5~200 parts by weight of silica based on 100 parts by weight of the rubber ingredient, is applied to at least one portion among rubber portions of the tire.

2. The tire according to claim 1, wherein said silane compound is represented by the following general formula:

$$Si(OR)_m R'_{4-m}$$

wherein OR is a nonhydrolyzable alkloxy group having a carbon number of 4~20, a non-hydrolyzable alkoxy group or a non-hydrolyzable cycloalkoxy group, R' is an alkyl group having a carbon number of 1~20, an aryl group, a vinyl group or a halogenated alkyl group, and m is an integer of 1~4.

3. The tire according to claim 1, wherein said silane compound is represented by the following general formula:

$$X_n Si(OR)_m R'_{4-m-n}$$

wherein X is a halogen atom selected from a chlorine atom, a bromine atom and an iodine atom, OR is a non-hydrolyzable aryloxy group having a carbon number of 6~20, R' is an alkyl group having a carbon number of 1~20, an aryl group, a vinyl group or a halogenated alkyl group, m is an integer of 1~4, n is an integer of 0~2, and a sum of n and m is 2~4.

4. The tire according to claim 2, wherein said silane compound is represented by the following general formula:

$$Si(OR)_m R'_{4-m}$$

wherein OR is a non-hydrolyzable aryloxy group having a carbon number of 6~20, R' is an alkyl group having a carbon number of 1~20, an aryl group, a vinyl group or a halogenated alkyl group and m is an integer of 1~4.

5. The tire according to claim 1, wherein said polymer rubber modified with said silane compound is obtained by reacting not less than 0.7 molecule of said silane compound per one active terminal of said living polymer.

6. The tire according to claim 3, wherein said silane compound is represented by the following general formula:

$$Si(OR)_m R'_{4-m}$$

wherein OR is a non-hydrolyzable aryloxy group having a carbon number of 6~20, R' is an alkyl group having a carbon number of 1~20, an aryl group, a vinyl group or a halogenated alkyl group and m is an integer of 1~4.

7. The tire according to claim 2, wherein said polymer rubber modified with said silane compound is obtained by reacting not less than 0.7 molecule of said silane compound per one active terminal of said living polymer.

8. The tire according to claim 3, wherein said polymer rubber modified with said silane compound is obtained by reacting not less than 0.7 molecule of said silane compound per one active terminal of said living polymer.

9. The tire according to claim 4, wherein said rubbery polymer modified with said silane compound is obtained by reacting not less than 0.7 molecule of said silane compound per one active terminal of said living polymer.

* * * * *